Jan. 24, 1956 H. C. LUECHAUER 2,731,876
EXCITER STAND FOR SPECTROGRAPH
Filed April 27, 1953 2 Sheets-Sheet 1

INVENTOR.
HOLLE C. LUECHAUER
BY
HIS ATTORNEY

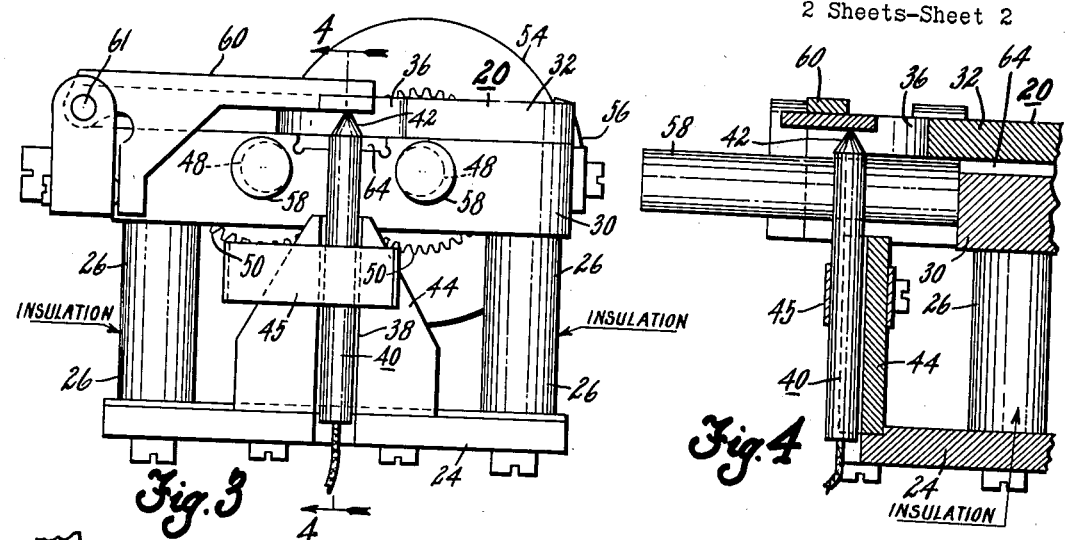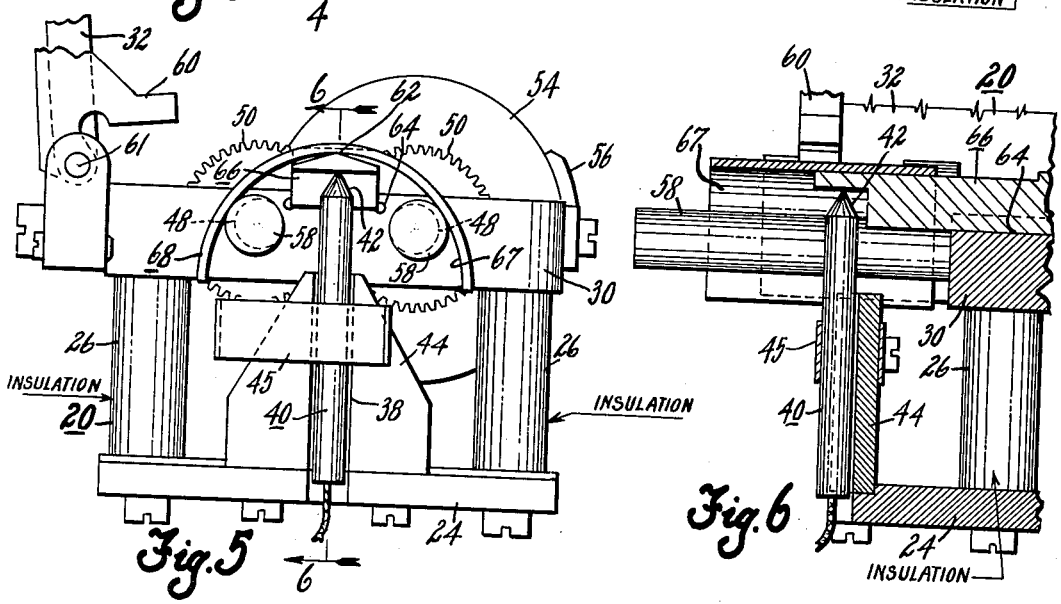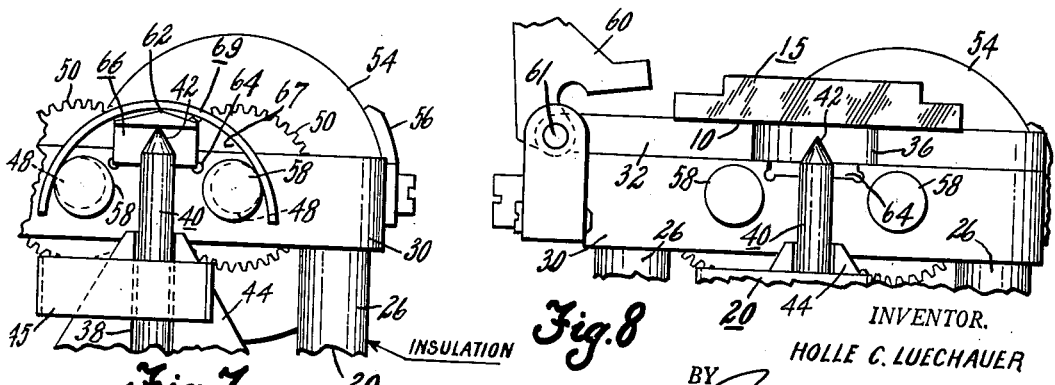

United States Patent Office 2,731,876
Patented Jan. 24, 1956

2,731,876

EXCITER STAND FOR SPECTROGRAPH

Holle C. Luechauer, Dayton, Ohio, assignor to General Motors Corporation, Detroit, Mich., a corporation of Delaware Application April 27, 1953, Serial No. 351,298

7 Claims. (Cl. 88—14)

This invention relates to a spectroscope and more particularly to an exciter stand therefore.

The basic object of this invention is to provide a specimen mounting means for a spectrograph which makes the use of said instrument flexible with respect to shape and size of specimens to be analyzed.

It is an object of the present invention to provide an exciter stand for use with a spectroscope whereon either a flat or curved surface of a specimen may be positioned for analyzation by a spectroscope employing a sparking electrode having a spaced relation to the surface to be analyzed.

A further object of the present invention is to provide an exciter stand for use with a spectroscope adapted to analyze light produced by a sparking arc of predetermined length formed between an electrode operatively carried by the stand and either a flat or curved surface of a specimen supported by said stand.

A more specific object of the present invention is to provide an exciter stand for use with a spectroscope. Said stand being constructed and arranged for maintaining either a flat or semicylindrical surface of a specimen in a predetermined spaced relation with reference to a sparking electrode carried by said stand whereby the light produced by a sparking arc between the electrode and surface of the specimen may be analyzed by the spectroscope. This object is materialized by having the electrode tip at a predetermined distance from the surface of a movable plate whereon flat surfaces of specimens may be placed and when said plate is moved to a remote position by having said tip located in a plane disposed midway between two parallel rotatively coupled shafts whereby all portions of a semicylindrical surface of the specimen when placed on said shafts to be analyzed will be equidistant from the tip of the sparking electrode when the specimen is properly positioned on said shafts.

A further purpose of the present invention is to modify an exciter stand used with a spectroscope whereon either a flat or curved semicylindrical surface of a specimen may be positioned in a spaced relation to a tip of a sparking electrode carried by said stand. This object is materialized by providing a plate pivotally mounted on said stand adapted for passing an arc of predetermined length through an opening therein to that portion of the flat surface to be analyzed and alternatively pivoting the plate to another position for exposing a positioning mechanism for maintaining portions of a curved surface at an equal distance from the electrode tip as when flat surfaces of specimens are analyzed. The positioning mechanism for the curved surfaces of specimens includes a pair of parallel and rotatably coupled shafts each having an end thereof eccentrically mounted on a rotating element and having means connected therewith for applying a calibrated rotation to said elements whereby the curved surface of a specimen bridging said shafts may be vertically positioned relative to the tip of a sparking electrode located in a plane midway between the shafts.

In carrying out the above objects it is another object of the present invention to provide a clearance test gage adapted for positioning a curved surface of a specimen with reference to the tip of a sparking electrode for calibrating the exciter stand mechanism.

Further objects and advantages of the present invention will be apparent from the following description reference being had to the accompanying drawings wherein a preferred embodiment of the present invention is clearly shown.

In the drawings:

Fig. 4 is a portion of a sectional view along line 4—4 in Fig. 3.

Fig. 5 shows an end view of the exciter stand whereon a specimen having a curved surface is positioned.

Fig. 6 is a portion of a sectional view along line 6—6 in Fig. 5.

Fig. 7 shows the test gauge in position for adjusting the position of the electrode and a curved surface of a specimen having a smaller diameter than shown in Fig. 5.

Fig. 8 shows a flat specimen in position on an exciter stand.

Fig. 9 diagrammatically shows a position of a surface of a specimen with reference to a spectroscope.

In the spectrographic analysis of specimen surfaces an exciter stand frequently is provided whereon a specimen is placed so that light from an arc produced between the surface of said specimen and the tip of a carbon electrode may enter a spectroscope. These stands, suitably arranged for the analyzation of flat surfaces of specimens frequently utilize a base plate with an electrode adjustably carried thereon and a specimen plate mounted at a distance and insulated from said base plate. When these stands are positioned with reference to the spectroscope and the specimen surface to be analyzed is placed over an opening in the specimen plate, an arc formed between the electrode and the specimen surface will pass through the opening in the specimen plate and thus provide the necessary light to the spectroscope.

The present invention is directed to an improvement of the above exciter stand and more specifically to a stand which will permit analyzation of a plurality of different shaped specimens having either flat or curved surfaces without adjustment of the electrode tip location or the use of special clamps and/or equipment for holding specimens as the flat and curved surfaces thereof are tested.

Figure 2:
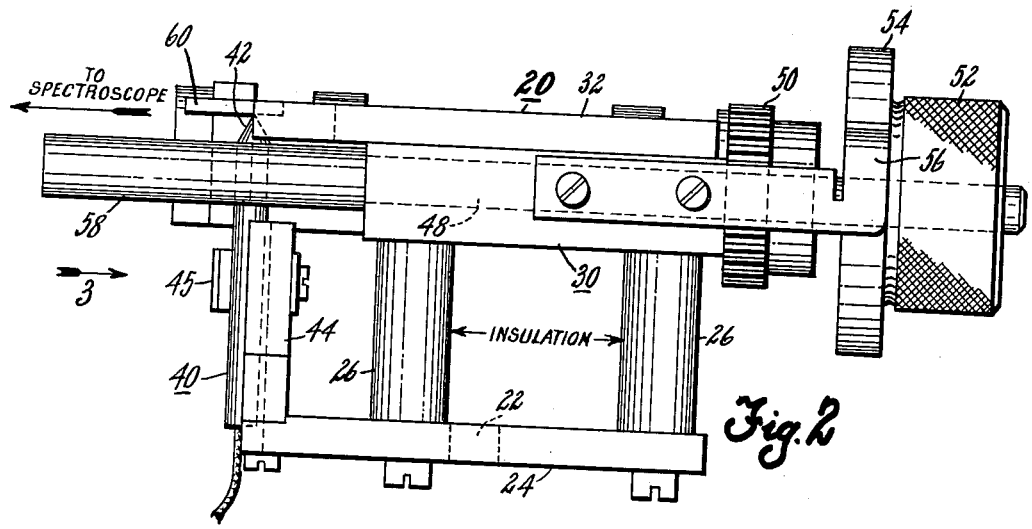
Fig. 2 is a side view of an exciter stand taken in the direction of arrow 2 in Fig. 1.

In the drawings the reference numeral 20 indicates an exciter stand adapted for positioning a specimen surface 10 for analysis by a spectroscope (diagrammatically shown in Fig. 9) located at a distance to the right and indicated by the arrow in Fig. 2. The stand 20 is preferably vertically positioned and mounted on a structure (not shown) through a mounting hole 22 located in a horizontal base plate 24 (Fig. 2). When the stand 20 is thus mounted it is adapted for passing light 12 (Fig. 9) from an arc 13 passing between the electrode 40 and a specimen 15, both of which will be hereinafter described, so the light 12 will be normal to a slit (not shown) in a spectroscope 11 wherein the light 12 may be analyzed in a manner well known to those skilled in the art.

Figure 1:
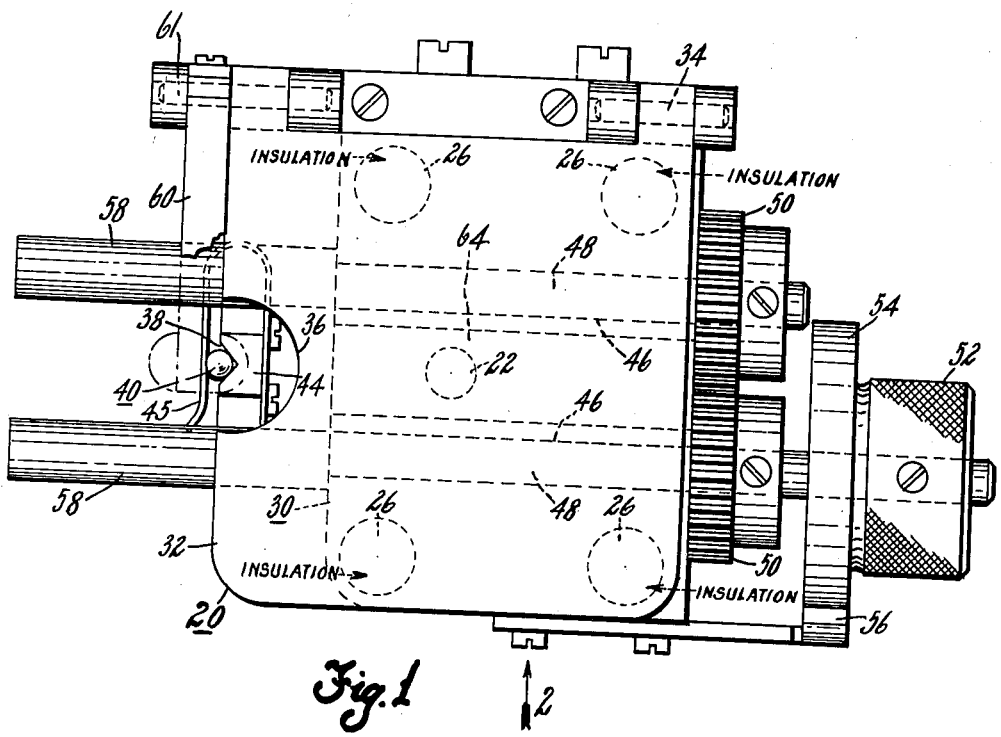
Fig. 1 shows a top view of one embodiment of the present invention.
Figure 3:
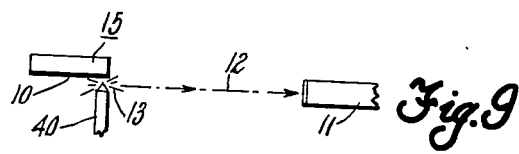
Fig. 3 is an end view of the device in the direction of the arrow 3 in Fig. 2.

In the present embodiment of the invention, a horizontal support 30 (Fig. 3) is insulated and spaced from the plate 24 with four vertical insulating posts 26 each having a terminal portion suitably attached to the respective structures. A specimen plate 32 is pivotally mounted on support 30 through a hinge 34 thus permitting plate 32 to be positioned either horizontally on frame 30 or moved to a vertical position so other portions of the support 30 hereinafter to be described may be accessible. Specimen plate 32 has a semicylindrical opening 36 (Fig. 1) along one edge constructed and arranged for exposing a portion of the bottom surface 10 of a specimen 15 (Fig. 8), when the bottom surface of the specimen is placed on the upper surface of plate 32 and bridging the opening 36. Thus an arc from the tip 42 of an electrode 40 may pass through opening 36 to the surface and provide the light which enters a spectroscope.

The above mentioned electrode 40 is positioned and maintained in spaced relation to the specimen surface by means of an electrode mounting structure fastened to base plate 24. This mounting structure comprises an electrode mounting frame 44, electrically connected to base plate 24, having a longitudinal groove 38 formed therein that is adapted for cooperating with a spring clamp 45 carried by the mounting frame 44. An electrode 40, when placed in groove 38 and maintained therein by spring clamp 45, may be axially moved therealong to provide a predetermined spacing between the tip 42 of electrode 40 and the specimen surface to be analyzed.

The horizontal support 30 is provided with a pair of parallel bores 46 for journalling a pair of rotative elements 48 having a pair of intermeshing gears 50 on one end thereof. A knob 52 having a calibrated wheel 54 thereon is connected to one of the gears and when the wheel 54 is turned and positioned in accordance with a calibration indicator 56, mounted on the horizontal support 30, a predetermined angular position will be imparted to the elements 48 and to a pair of shafts 58 eccentrically mounted on the other ends of each of the elements 48. Thus, the curved surface of a specimen bridging the shafts 58 will be vertically moved with reference to the support 30 and electrode tip 42 as the eccentrically mounted coupled shafts 58 are rotated as is clearly shown in Figs. 5 and 6.

An electrode positioning device 60, mounted through a hinge 61 to the horizontal support 30, is constructed and arranged for vertical positioning of the electrode tip 42 relative to the top surface of the specimen plate 32. When the electrode positioning device 60 is rotated into horizontal position (Figs. 2, 3 and 4) on hinge 61, a portion thereof will engage the electrode tip 42 and axially slide the electrode 40 in a groove 38 and thereby position the electrode tip 42 with reference to the stand 20. Normally when the positioning device 60 is not in use it is vertically pivoted to an out of the way position (Fig. 5).

A slot 64 is provided in the top portion of horizontal support 30 wherein a gauge 66 may be positioned. The gauge 66 has an apex portion 62 adapted to engage the curved surface 67 of the specimen 68 (Fig. 5) and is sized for positioning surface 67 at a predetermined distance from the electrode tip 42, thereby providing an arc of desired length for furnishing light for the spectrograph. It is to be here noted that if the gauge be properly sized and located, the position of the apex portion 62 of the gauge engaging the curved specimen may correspond to the position of the flat surface of a specimen 15 when a flat surface is placed upon the specimen plate 32. When this position is determined for any particular diameter of semicylindrical surface a mark may be placed upon the calibration wheel 54, so that when the electrode is correctly positioned by the electrode positioning device 60, the exciter stand may be used to test a flat surfaced specimen on plate 32 or semicylindrical specimens of a given diameter upon shafts 58 without any repositioning of the electrode. Further the wheel 54 may be calibrated to position specimens having a specified diameter within a predetermined range. Thus the specimen 69 shown in Fig. 7 has a smaller diameter than the specimen 68 in Fig. 5 and when the apex portion 62 of gauge 66 is used to locate the respective surfaces, to calibrate wheel 54, each of the surfaces will be at an equal distance from tip 42 of the electrode 40.

It is manifest that electrical connections are necessary, so that an arc may be formed between the electrode and the specimen. These connections may be made to a wide variety of locations providing the electrode or base plate is of one polarity and the opposite polarity is imparted to the horizontal support which is insulated from the base plate with vertical insulating posts 26.

It is to be here noted that if the curved surface of the specimen is semicylindrical in shape, a multiplicity of tests on various portions of the surface may be made as the semicylindrical surface will always be located at a predetermined normal distance from the electrode tip as the specimen may be rotated to different analyzing positions by rotation of the specimen on its center by shifting the specimen on its supports so an analysis may be made on any portion of its surface regardless of the angular position of the specimen. As heretofore set forth, specimens having various diameters may be located at the required normal distance from the electrode tip when the eccentric shafts are rotated thus raising and lowering the semicylindrical surface bridging the shafts. If the calibrated wheel 54 is properly marked the correct spacing between the specimen and electrode will be obtained regardless of the radius of the specimen when knob 52 is turned to the calibrated position.

The exciter stand 20 according to the present invention is extremely useful in the production testing of various small pieces having both flat and curved surfaces and is particularly adapted for the testing of bearing surfaces although other objects having various shapes may be positioned on the stand. It is manifest that due to the arrangement and location of the electrode tip with reference to the parallel and eccentrically mounted shafts, a semicylindrical bearing, when placed upon the charts so as to form a bridge therebetween, will be moved relative to the tip as the angularity of the shafts is changed.

It is further apparent various surfaces of specimens having other shapes and sizes may be analyzed when the specimen is positioned on a stand as disclosed. For example both inner and outer surfaces of a full cylindrical specimen may be analyzed if a suitably shaped and sized electrode and support therefore is provided whereby the electrode tip will project into and be received within the hollow specimen when the inner surface of a hollow cylindrically shaped specimen is analyzed, and if an outer surface thereof is analyzed a repositioning of the electrode coupled with a recalibration and/or repositioning of the exciter stand or elements thereof will accomplish a similar result providing in each case that the location of the tip of the electrode is in a proper spaced relation with the slit of the spectroscope.

While the embodiment of the present invention constitutes a preferred form, it is to be understood that other forms might be adopted.

What is claimed is as follows:

1. An exciter stand for use with a spectrograph using a sparking electrode and adapted for maintaining a surface of a specimen in adjusted spaced relation to said electrode comprising in combination; a support, a pair of spaced elements rotatable relative to said support, a sparking electrode carried by said support and spaced with reference to said elements, a pair of shafts extending in the same direction in spaced parallel relation and operatively connected with said elements, said shafts being constructed and arranged for supporting a specimen therebetween and for moving a surface of said specimen into an adjusted spaced relation with said electrode as said elements are rotated with reference to said support.

2. An exciter stand for use with a spectrograph having a sparking electrode mounted thereon and adapted for positioning a surface of a specimen in adjusted spaced relation to said electrode comprising in combination; a support, a pair of spaced elements rotatively mounted on said support, a sparking electrode having a sparking end thereon carried by said support and spaced with reference to said elements, a pair of parallel shafts each eccentrically connected with one of said elements for supporting a specimen having a curved surface thereon whereby a rotation of said elements with reference to the support will impart rotative movement to said shafts and thereby position a curved surface of the specimen with reference to the electrode.

3. An exciter stand for use with a spectrograph having a sparking electrode mounted thereon adapted for positioning a surface of a specimen in spaced relation to said electrode comprising in combination; a support, a pair of spaced elements rotatively coupled and carried by said support, a sparking electrode having a sparking end thereon carried by said support and spaced with reference to said elements, a pair of parallel shafts each eccentrically connected with one of said elements for supporting a specimen having a curved surface of a constant radius thereon when a portion of said specimen surface is in contact with each shaft and thus held spaced from a sparking end of the electrode, whereby rotation of the elements is accompanied by a corresponding movement along the axis of the sparking end of the electrode while a constant and normal spacing between the curved surface of the specimen and the sparking end of the electrode is maintained when the specimen is shifted on the shafts.

4. An exciter stand for use with a spectrograph having a sparking electrode thereon and adapted for positioning a surface of a specimen in spaced relation to said electrode comprising in combination; a support, a pair of spaced parallel elements rotatively coupled and carried by said support, a sparking electrode having a sparking end thereon and intermediately spaced on an axis parallel to said elements, a pair of parallel shafts each of which has an end thereof eccentrically carried by one of said elements for supporting a specimen having a semicylindrical surface in contact with each shaft and spaced from a sparking end of the electrode whereby a rotation of the elements is accompanied by a variation in spacing between the specimen and said sparking electrode and a constant spacing between the curved surface of the specimen and the sparking end of the electrode is maintained as the specimen is rotated on the shafts.

5. A spectrograph exciter stand having a sparking electrode mounted thereon and adapted for positioning specimens having flat or curved surfaces in spaced relation to said electrode, comprising in combination; a support having an electrode with a sparking end carried by said support, a plate pivotally mounted on said support and adapted in one position for positioning a flat surface of a specimen at a predetermined distance from said electrode, said plate having an opening therein whereby an arc between a flat surface of the specimen and the electrode end may pass therethrough, and means for positioning a surface of a specimen from said electrode when said plate is pivotally rotated to a second position, said means including a pair of elements rotatively carried by said support, a pair of parallel shafts each eccentrically connected with one of said elements and arranged for supporting said curved surface of the specimen thereon whereby a rotation of said elements with reference to the support will impart rotative movement to said shafts and thereby normally position said curved surface with reference to said electrode.

6. A spectrograph exciter stand as set forth in claim 5 wherein a means is provided for positioning a gauge for determining the position of a sparking end of the electrode with reference to said support.

7. A spectrograph exciter stand having a sparking electrode mounted thereon and adapted for positioning specimens having flat or curved surfaces in spaced relation to said electrode, comprising in combination; a support having an electrode with a sparking end carried by said support, and adapted in one position for maintaining a flat surface of a specimen at a predetermined distance from said electrode, a plate carried by said support and having an opening therein whereby an arc between a flat surface of the specimen and the electrode end may pass therethrough, and means for positioning at the same predetermined distance a semicylindrical surface of a specimen from said electrode when said plate is pivotally rotated to a second position, said means including a pair of elements rotatively carried by said support, a pair of parallel shafts each eccentrically connected with one of said elements and arranged for supporting said curved surface of the specimen thereon whereby a rotation of said elements with reference to the support will impart rotative movement to said shafts and thereby position said curved surface with reference to said electrode.

References Cited in the file of this patent
UNITED STATES PATENTS

| | | |
|---|---|---|
| 2,271,893 | Brundin et al. | Feb. 3, 1942 |
| 2,324,899 | Arthur | July 20, 1943 |
| 2,344,719 | Nusbaum et al. | Mar. 21, 1944 |
| 2,346,512 | Scribner et al. | Apr. 11, 1944 |